United States Patent
Fukuda

(10) Patent No.: US 8,207,979 B2
(45) Date of Patent: Jun. 26, 2012

(54) IMAGE PROCESSING APPARATUS, IMAGE PROCESSING METHOD, AND COMPUTER PROGRAM PRODUCT

(75) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 444 days.

(21) Appl. No.: 12/477,283

(22) Filed: Jun. 3, 2009

(65) Prior Publication Data

US 2009/0303244 A1     Dec. 10, 2009

(30) Foreign Application Priority Data

Jun. 6, 2008    (JP) ................... 2008-149361
Apr. 16, 2009  (JP) ................... 2009-099598

(51) Int. Cl.
*G06T 5/00* (2006.01)
*G09G 5/36* (2006.01)

(52) U.S. Cl. ....................... 345/555; 345/556

(58) Field of Classification Search .............. 345/555, 345/556

See application file for complete search history.

(56) References Cited

U.S. PATENT DOCUMENTS

| 2003/0005464 | A1* | 1/2003 | Gropper et al. ............... 725/115 |
| 2006/0195464 | A1* | 8/2006 | Guo ............................. 707/101 |
| 2007/0230561 | A1* | 10/2007 | Ichieda ........................ 375/240 |
| 2007/0279703 | A1 | 12/2007 | Fukuda |
| 2008/0170257 | A1 | 7/2008 | Fukuda |
| 2008/0259408 | A1 | 10/2008 | Fukuda |

FOREIGN PATENT DOCUMENTS

| JP | 5-191762 | 7/1993 |
| JP | 6-171151 | 6/1994 |
| JP | 3153347 | 1/2001 |
| JP | 2007-306143 | 11/2007 |

* cited by examiner

*Primary Examiner* — Jacinta M Crawford
(74) *Attorney, Agent, or Firm* — Cooper & Dunham LLP

(57) ABSTRACT

A storage unit stores therein first image data having a file size smaller than a predetermined size and a second image data having a file size larger than the predetermined size. The first image data and the second image data represent the same contents. A file selecting unit selects either one of the first image data and the second image data whichever having a shorter display time. A display unit displays thereon selected image data.

13 Claims, 10 Drawing Sheets

FIG. 7

|  |  | PERFORMANCES OF I/F | |
|---|---|---|---|
|  |  | HIGH | LOW |
| PERFORMANCES OF CPU OF OPERATION DISPLAY UNIT | HIGH | SECOND JPEG-COMPRESSED IMAGE OR FIRST SMALL IMAGE | FIRST JPEG-COMPRESSED IMAGE OR SECOND SMALL IMAGE |
|  | LOW | THIRD SMALL IMAGE | FOURTH SMALL IMAGE |

| VOLUME | LARGE | | | SMALL |
|---|---|---|---|---|
| SMALL IMAGE: | FOURTH SMALL IMAGE | THIRD SMALL IMAGE | SECOND SMALL IMAGE | FIRST SMALL IMAGE |

| COMPRESSION RATIO | HIGH | LOW |
|---|---|---|
| JPEG-COMPRESSED IMAGE | FIRST JPEG-COMPRESSED IMAGE | SECOND JPEG-COMPRESSED IMAGE |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-149361 filed in Japan on Jun. 6, 2008 and Japanese priority document 2009-099598 filed in Japan on Apr. 16, 2009.

BACKGROUND OF THE INVENTION

1. Field of the Invention

The present invention relates to a technology for transferring image data from a storage device to a display device for displaying the image data.

2. Description of the Related Art

As a technology to display large image data for browsing, a typical image processing apparatus compresses original image data, and stores therein the compressed image data having a file size smaller than the original image data. The typical image processing apparatus displays on a display unit the image data that is obtained by decompressing the stored compressed image data (see Japanese Patent Application Laid-open No. H5-191762 and Japanese Patent Application Laid-open No. H6-171151).

The compression is a process of coding the image data on a file basis or a block basis, thereby creating a bitstream of the compressed image. The bit size of most of the bitstreams of the compressed images is not large enough to display the image with an uncompressed format.

An advantage of the compression process is that a memory space occupied by the compressed image data on a recording medium, such as a random access memory (RAM), a disk, and a magnetic tape, is smaller than that occupied by uncompressed image data. Moreover, the compression process is effective from the viewpoint of data transfer. The smaller bitstream of the compressed image is transferred in a shorter time than a time that it takes to transfer the uncompressed image.

However, if only the compressed image data having the smaller file size is stored in the image processing apparatus, a decompression process is always required before displaying the image. Therefore, it takes a long time to display the image, which disadvantageously decreases a speed of browsing the image data.

SUMMARY OF THE INVENTION

It is an object of the present invention to at least partially solve the problems in the conventional technology.

According to one aspect of the present invention, there is provided an image processing apparatus including a storage unit that stores therein first image data having a file size smaller than a predetermined size and a second image data having a file size larger than the predetermined size, the first image data and the second image data representing same contents; a file selecting unit that selects either one of the first image data and the second image data whichever having a shorter display time; and a display unit that displays thereon selected image data.

Furthermore, according to another aspect of the present invention, there is provided an image processing method for an image processing apparatus that includes a storage unit that stores therein first image data having a file size smaller than a predetermined size and a second image data having a file size larger than the predetermined size in a storage unit, the first image data and the second image data representing same contents and a display unit that displays thereon image data. The image processing method includes selecting either one of the first image data and the second image data whichever having a shorter display time; and displaying selected image data on the display unit.

Moreover, according to still another aspect of the present invention, there is provided a computer program product including a computer-usable medium having computer-readable program codes embodied in the medium for processing image in an image processing apparatus that includes a storage unit that stores therein first image data having a file size smaller than a predetermined size and a second image data having a file size larger than the predetermined size in a storage unit, the first image data and the second image data representing same contents and a display unit that displays thereon image data. The program codes when executed cause a computer to execute selecting either one of the first image data and the second image data whichever having a shorter display time; and displaying selected image data on the display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic diagram for explaining a method of creating a small image, taking performances of a CPU and performances of an I/F into consideration according to the second embodiment;

DETAILED DESCRIPTION OF THE PREFERRED EMBODIMENTS

Exemplary embodiments of the present invention are described in detail below with reference to the accompanying drawings.

In a first embodiment of the present invention, it is assumed that an uncompressed file includes image data larger than a reference size, and a compressed file includes image data smaller than the reference size.

Figure 1:
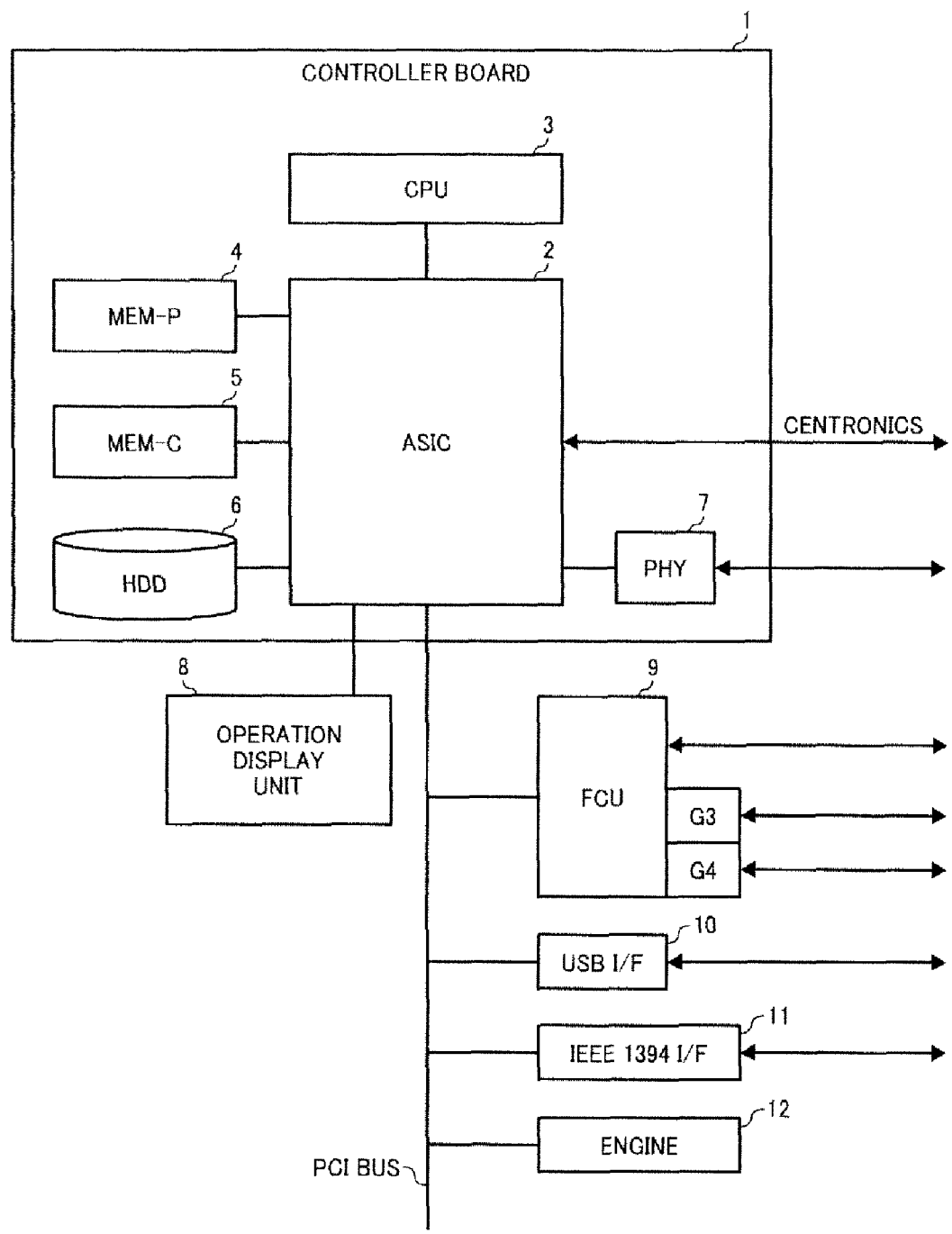
FIG. 1 is a block diagram of system configuration of an image processing apparatus according to a first embodiment of the present invention.

FIG. 1 is a block diagram of system configuration of an image processing apparatus according to the first embodiment. The image processing apparatus includes a controller board 1 and an engine unit 12, connected to each other via a peripheral component interconnect (PCI) bus. The controller board 1 controls the image processing apparatus, more particularly, controls drawing, communications, inputs that are received via an operation unit (not shown), and the like. The engine unit 12 is, for example, a printer engine connectable to the PCI bus. The printer engine includes, for example, a black-and-white plotter, a single-drum color plotter, a four-drum color plotter, a scanner, and a facsimile unit. The engine unit 12 includes, in addition to an engine for the plotters, an image processing unit that performs, for example, error diffusion or gamma conversion.

The controller board 1 includes a central processing unit (CPU) 3, a system memory (MEM-P) 4, a local memory (MEM-C) 5, an application specific integrated circuit (ASIC) 2, a hard disk drive (HDD) 6, and a physical layer (PHY) chip 7.

The CPU 3 controls the image processing apparatus. The CPU 3 includes a chipset. The CPU 3 is connected to various devices including the MEM-P 4 via the chipset.

The MEM-P 4 is a system memory that is used as a storage memory in which various programs or data are stored, a load memory on which various programs or data are loaded, and a drawing memory for the printer. The MEM-P 4 includes a read only memory (ROM) and a RAM. The ROM is a read only memory in which various programs or data are stored. The RAM is a writable and readable memory that is used as the load memory on which various programs or data are loaded or the drawing memory for the printer.

The ASIC 2 includes a hardware component for the image processing, thereby acting as an integrated circuit (IC) dedicated to image processing. The ASIC 2 connects, as a bridge, the PCI bus, the HDD 6, and the MEM-C 5 to one another. The ASIC 2 includes a PCI target; an arbiter (ARB) as a main unit of the ASIC 2; a memory controller that controls the MEM-C 5; a plurality of direct memory access controllers (DMACs) that performs image processing, e.g., rotating the image by using a hardware logic or the like; and a PCI unit that transfers data to/from the engine unit 12 via the PCI bus. The ASIC 2 is connected to various devices such as a facsimile control unit (FCU) 9, a universal serial bus interface (USB I/F) 10, and an IEEE 1394 I/F 11 via the PCI bus. An operation display unit 8 is directly connected to the ASIC 2.

The MEM-C 5 is a local memory that is used as an image buffer that stores therein image data to be copied or a code buffer. The HDD 6 is a storage device that stores therein image data, programs, font data, and form data.

Figure 2:
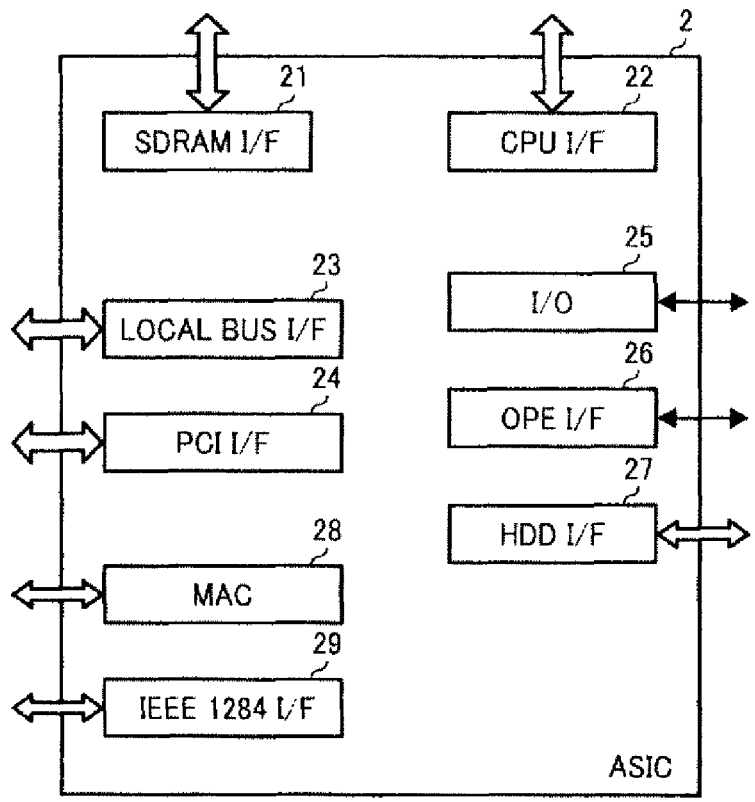
FIG. 2 is a block diagram of an ASIC shown in FIG. 1.

FIG. 2 is a block diagram of the ASIC 2. The ASIC 2 includes a synchronous dynamic random access memory (SDRAM) I/F 21, a CPU I/F 22, a local bus I/F 23, a PCI I/F 24, an input/output (I/O) unit 25, an operator product expansion (OPE) I/F 26, an HDD I/F 27, a media access control (MAC) 28, and an IEEE 1284 I/F 29.

The SDRAM I/F 21 is an I/F connected to an SDRAM. The CPU I/F 22 is an I/F connected to the CPU 3. The local bus I/F 23 is an I/F connected to the local bus. The PCI I/F 24 is an I/F based on the PCI. The I/O unit 25 performs I/O control for the image processing apparatus. The OPE I/F 26 is an I/F connected the operation panel. The HDD I/F 27 is an I/F connected to the HDD 6. The MAC 28 is a media access control chip. The IEEE 1284 I/F 29 is an I/F based on the IEEE 1284.

Figure 3:
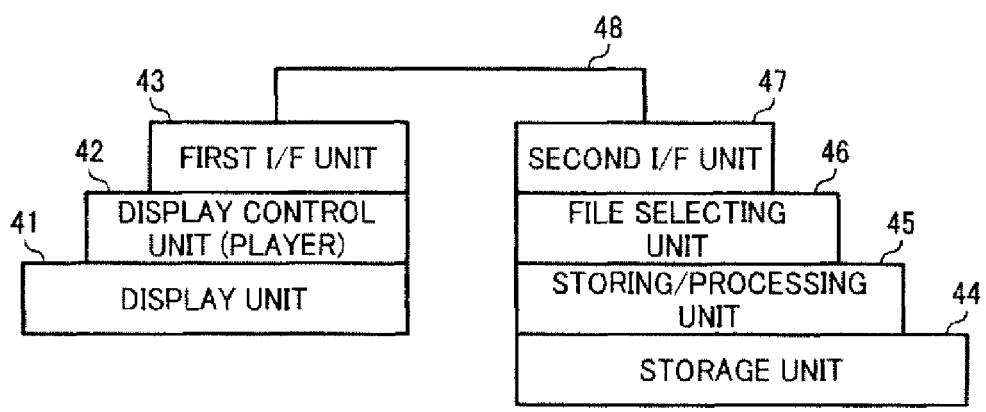
FIG. 3 is a block diagram of configuration for reading image data from an HDD or an MEM-P shown in FIG. 1, and displaying the image data on an LCD of an operation display unit.

FIG. 3 is a block diagram of configuration for reading the image data from the HDD 6 or the MEM-P 4, and displaying the image data on a liquid crystal display (LCD) of the operation display unit 8.

A display unit 41 shown in FIG. 3 is a hardware component including an LCD panel and a circuit that drives the LCD panel. A display control unit 42 is an application such as a display player, stored in the MEM-C 5. A first I/F unit 43 is an I/F connected to a second I/F unit 47.

The display unit 41, the display control unit 42, and the first I/F unit 43 form an image display device according to the first embodiment as a unit. From the viewpoint of layer arrangement, the display unit 41, the display control unit 42, and the first I/F unit 43 are arranged in this order with the display unit 41 being the highest.

A storage unit 44 is a hardware component that stores therein data files or the like. The storage unit 44 corresponds to the HDD 6 and the MEM-P 4 shown in FIG. 1. More particularly, the storage unit 44 stores therein the compressed files or the uncompressed files as the data files.

A storing/processing unit 45 stores the image data in the storage unit 44. More particularly, the storing/processing unit 45 stores the uncompressed file of the image data and the compressed file of the image data. The formats of the uncompressed file and the compressed file to be stored are determined. The uncompressed file is, for example, a BMP file. The compressed file is, for example, a JPEG file. The types of the file formats can be one, two, or more. The contents of the image data that is obtained to be displayed on the display unit 41 by decompressing the compressed file are the same as the contents of the image data that is obtained to be displayed on the display unit 41 from the uncompressed file.

The storing/processing unit 45 calculates a time that it takes to display the compressed file or the uncompressed file (hereinafter, "display time"), and generates selection information. Either the compressed file or the uncompressed file is selected by referring to the selection information so that the shorter display time is taken. The selection information includes, more particularly, a compressed-file flag and an uncompressed-file flag. If the compressed-file flag is ON, the compressed file is selected. If the uncompressed-file flag is ON, the uncompressed file is selected. The storing/processing unit 45 stores the image data, the compressed file, the uncompressed file, and the selection information in the storage unit 44, associated with each other. A method of calculating the display time will be described later.

The storing/processing unit 45 can create the selection information each time when receiving a file transfer request from the display control unit 42. Alternatively, the storing/processing unit 45 can create the selection information before receiving the file transfer request. In the first embodiment, the storing/processing unit 45 creates the selection information when storing components of the image data in the storage unit 44, and stores the selection information in the storage unit 44.

A file selecting unit 46, which is implemented by executing a software program, selects, in response to a file acquirement request that is received via the second I/F unit 47, either the compressed file or the uncompressed file by referring to the selection information. The software program for implementing the file selecting unit 46 is stored in the MEM-C 5 shown in FIG. 1.

The second I/F unit 47 is an I/F connected to an I/F 48. The storage unit 44, the storing/processing unit 45, the file selecting unit 46, and the second I/F unit 47 form an image storing device according to the first embodiment as a unit. From the viewpoint of layer arrangement, the storage unit 44, the storing/processing unit 45, the file selecting unit 46, and the second I/F unit 47 are arranged in this order with the storage unit 44 being the highest. The first I/F unit 43 and the second I/F unit 47 is connected to each other via the I/F 48.

Figure 4:
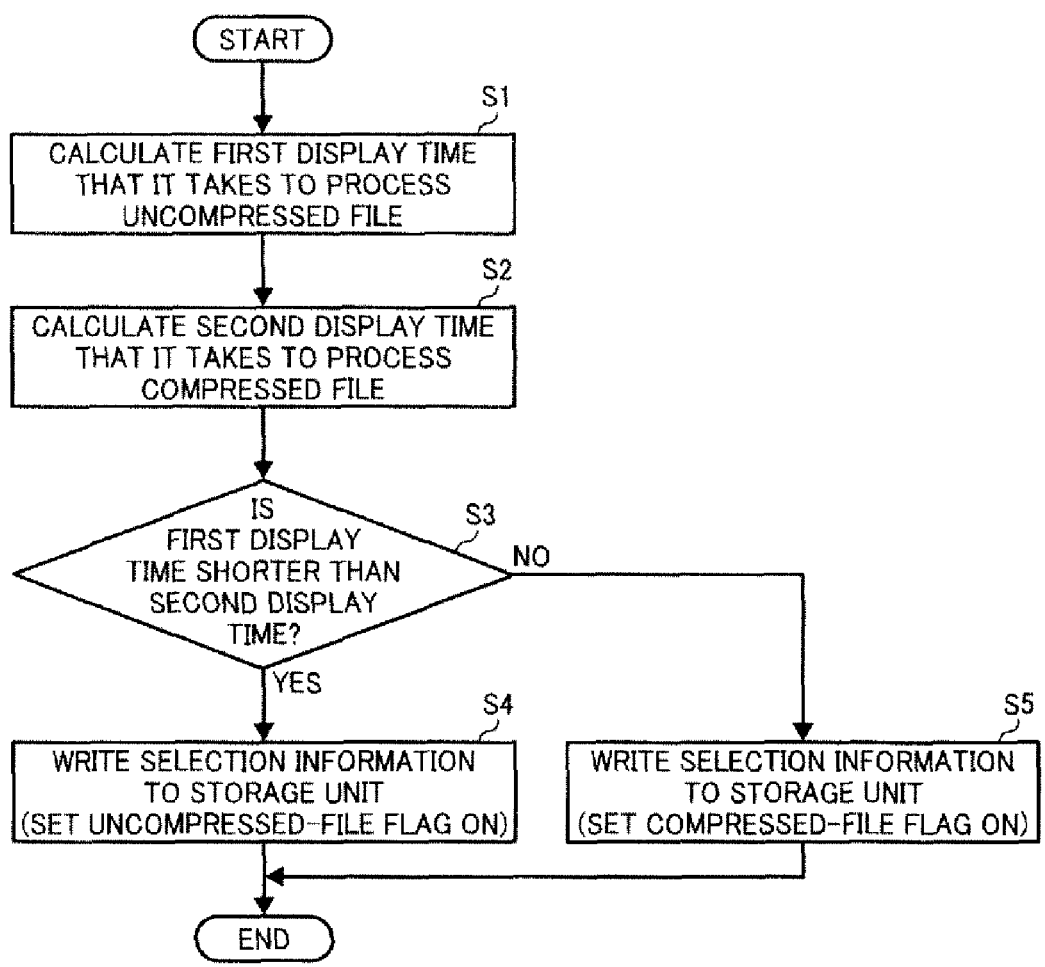
FIG. 4 is a flowchart of a selection-information creating process according to the first embodiment.

FIG. 4 is a flowchart of a selection-information creating process performed by the storing/processing unit 45. The storing/processing unit 45 calculates a first display time that it takes to display the image data on the display unit 41 since the uncompressed file is read from the storage unit 44 (Step S1). The storing/processing unit 45 calculates a second display time that it takes to display the image data on the display unit 41 since the compressed file is read from the storage unit 44 (Step S2).

The first display time is equal to a file transfer time. The second display time is equal to a sum of the file transfer time and a file decompressing time. The file transfer time is calculated by dividing a volume of the file by a transfer speed of the I/F 48. The file decompressing time is calculated by dividing a volume of the file by a decompressing speed of the display control unit 42. The transfer speed of the I/F 48 and the decompressing speed of the display control unit 42 are fixed values. Information about the transfer speed of the I/F 48 and the decompressing speed of the display control unit 42 is stored in a nonvolatile memory (not shown) of the controller board 1.

A method of calculating the first display time and the second display time according to the first embodiment is described with reference to the following table 1.

TABLE 1

| | File size [Kb] | Communication speed [Mb/s] | File transfer time $t_{ft}$ [ms] | File decompressing speed [Kb/s] | File decompressing time $t_{fd}$ [ms] | $t_{ft} + t_{fd}$ [ms] |
|---|---|---|---|---|---|---|
| Compressed-file format | 10 | 8 | 1.25 | 300 | 33.33 | 34.58 |
| Uncompressed-file format | 100 | 8 | 12.50 | — | 0 | 12.50 |

Assume that the volume of the compressed file of a target image is 10 Kb; the size of the uncompressed file of the target image is 100 Kb; the transfer speed of the I/F 48 is 8 Mb/s; the decompressing speed of the display control unit 42 is 300 Kb/s. Then, the file transfer time that it takes to transfer the compressed file is 1.25 ms (10 Kb÷8 Mb/s); the file transfer time $t_{ft}$ that it takes to transfer the uncompressed file is 12.5 ms (100 Kb÷8 Mb/s); the file decompressing time $t_{fd}$ that it takes to decompress the compressed file is 33.33 ms (10 Kb÷300 Kb/s). Therefore, the second display time using the compressed file is 34.58 ms ($t_{ft}+t_{fd}$); and the first display time using the uncompressed file is 12.5 ms.

Referring back to FIG. 4, after calculating the first display time and the second display time, the storing/processing unit 45 writes the selection information in the storage unit 44 (Steps S3 to S5). More particularly, the storing/processing unit 45 sets either the uncompressed-file flag or the compressed-file flag ON. If the first display time is shorter than the second display time (Yes at Step S3), the storing/processing unit 45 writes the selection information indicating that the uncompressed file is to be selected (Step S4). More particularly, the storing/processing unit 45 sets the uncompressed-file flag ON. If the second display time is shorter than the first display time (No at Step S3 ), the storing/processing unit 45 writes the selection information indicating that the compressed file is to be selected (Step S5). More particularly, the storing/processing unit 45 sets the compressed-file flag ON. In the case with the properties shown in Table 1, the storing/processing unit 45 sets the uncompressed-file flag ON.

Figure 5:
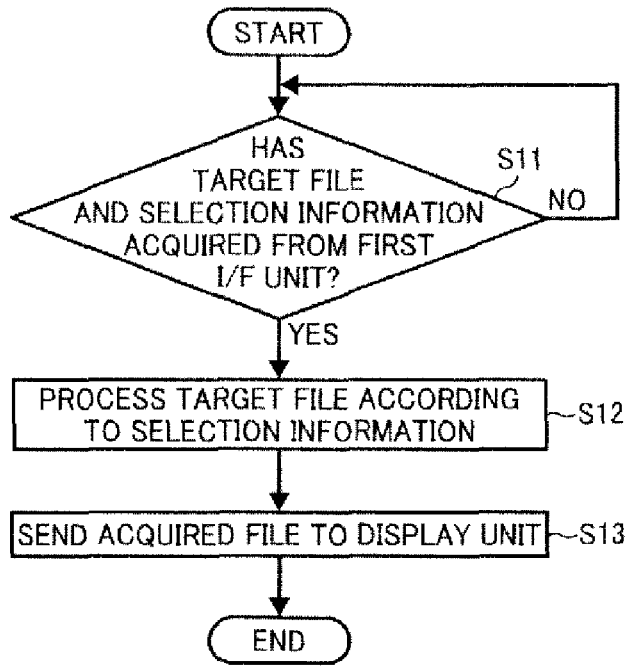
FIG. 5 is a flowchart of a file acquiring process performed by a display control unit according to the first embodiment.
Figure 6:
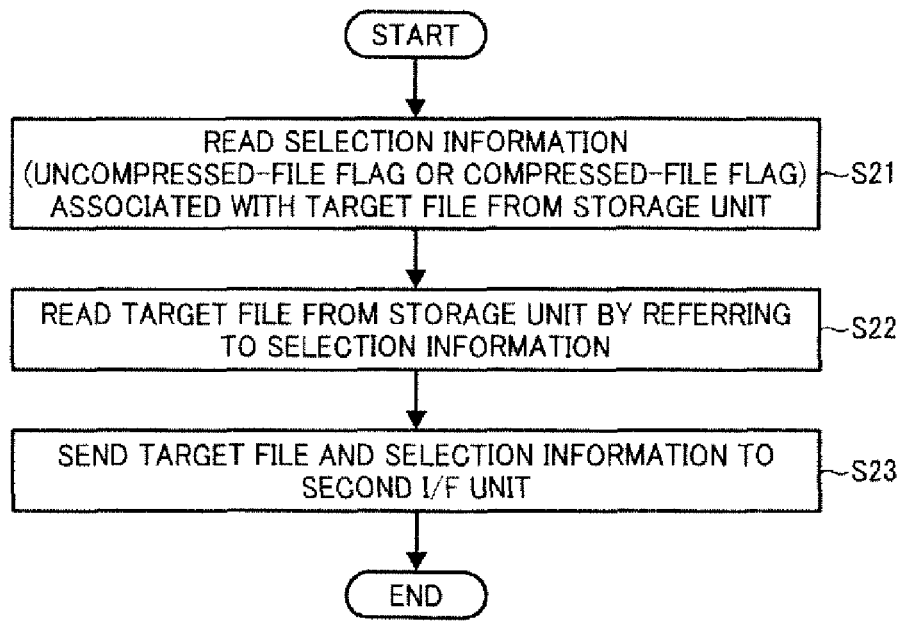
FIG. 6 is a flowchart of a file selecting process performed by a file selecting unit according to the first embodiment.

A process in which the display control unit 42 reads the components of the target image data from the storage unit 44, and displays the acquired components of the target image data is described with reference to FIGS. 5 and 6. FIG. 5 is a flowchart of a file acquiring process performed by the display control unit 42. FIG. 6 is a flowchart of a file selecting process performed by the file selecting unit 46.

As shown in FIG. 5, the display control unit 42 sends an acquirement request to the first I/F unit 43 to acquire the target image data and the selection information associated with the target image data. The acquirement request is sent to the second I/F unit 47 via the I/F 48.

As shown in FIG. 6, the second I/F unit 47 sends an inquiry about the target image data and the selection information to the file selecting unit 46. Upon receiving the inquiry, the file selecting unit 46 reads the selection information (the uncompressed-file flag or the compressed-file flag) from the storage unit 44 (Step S21), and reads either the uncompressed file or the compressed file from the storage unit 44 by referring to the acquired selection information (Step S22). The file selecting unit 46 sends the acquired file and the acquired selection information to the second I/F unit 47 (Step S23). Thus, the process control goes to end.

The second I/F unit 47 sends the received file and the received selection information to the first I/F unit 43 via the I/F 48. As shown in Step S11 of FIG. 5, after sending the acquirement request to the first I/F unit 43 to acquire the target image data and the selection information associated with the target image data, the display control unit 42 waits for the target image data and the selection information. Upon acquiring the target file and the selection information associated with the target file (Yes at Step S11), the display control unit 42 identifies, based on the acquired selection information, a type of the acquired file, i.e., the compressed file or the decompressed file. The display control unit 42 processes the file according to the acquired selection information (Step S12). More particularly, if the acquired file is the compressed file, the display control unit 42 decompresses the file, and converts the decompressed file into displayable data. If the acquired file is the uncompressed file, the display control unit 42 converts the file into the displayable data. The display control unit 42 sends the processed file to the display unit 41 (Step S13).

The configuration of the image processing apparatus can be changed based on a product lineup or optional items. For example, if a hardware component of the display unit 41 is replaced with a new one having different processing performances, the updated properties shown in Table 1 are updated, and therefore the different first display time and the different second display time will be calculated. To address such a replacement, when a hardware component of the display unit 41 is replaced with a new one, the storing/processing unit 45 detects the hardware replacement, and updates the selection information by performing the selection-information creating process shown in FIG. 4. The hardware replacement can be detected, for example, from the software that is updated associated with the replacement of the display unit 41. Alternatively, the hardware replacement can be detected from detection of a hardware signal (e.g., signal from a gio port) by the image processing apparatus. Moreover, it is possible to acquire the file decompressing time, as a property of the display control unit 42, from the updated software.

In this manner, the image processing apparatus according to the first embodiment stores therein the compressed file and the uncompressed file of the target image. To display the image, the image processing apparatus selects the file having the shorter display time between the compressed file and the uncompressed file, by referring to the volume of the compressed file, the volume of the uncompressed file, the transfer time for transferring the compressed file, the transfer time for transferring the uncompressed file, and the decompressing time for decompressing the compressed file. Thus, the image data is displayed in the shorter time in such a manner taken the file volume and the hardware performances into consideration.

Moreover, to acquire the target image data, the display control unit 42 sends the request for the target image data and the selection information associated with the target image data, and acquires, from the file selecting unit 46, information about the file to be processed, the compressed file or the uncompressed file as the acquired selection information. Thus, the display control unit 42 displays the image in such a manner suitable for the type of the file and the hardware performances.

The presence of the selection information, which is created by the storing/processing unit 45 when the compressed file and the uncompressed file of the image are stored in the storage unit 44, makes it possible for the file selecting unit 46 to determine which file is to be selected, the compressed file or the uncompressed file, in response to the file acquirement request. With this configuration, the display control unit 42 acquires the target file within the short time.

Moreover, when a hardware component of the display control unit 42 is replaced with a new one, the replacement is detected. After the detection, the first display time and the second display time are re-calculated from the volume of the compressed file, the volume of the uncompressed file, the transfer time for transferring the compressed file, the transfer time for transferring the uncompressed file, and the decompressing time for decompressing the compressed file; and the selection information is re-created from the re-calculated first display time and the re-calculated second display time. Thus, even when the hardware component is replaced, the image is displayed in the displaying manner most suitable for the performances (high-speed display).

Furthermore, with the replacement of the hardware component of the display unit 41, it is possible to display the image in the most-suitable displaying manner (high-speed display) by downsizing the image or compressing the image based on a JPEG format in such a manner suitable for the performances of the CPU and the performances of the I/F. FIG. 7 is a schematic diagram for explaining a method of creating a file of a small-sized image (hereinafter, "small image"), taking the performances of the CPU and the performances of the I/F into consideration according to the second embodiment. The small image includes a first small image, a second small image, a third small image, and a fourth small image.

If the CPU has a clock frequency higher than a reference clock frequency and the I/F has the transfer speed higher than a reference transfer speed, the first small image or a JPEG file that is created by compressing the image at a high compression ratio (hereinafter, "second JPEG-compressed image") is created. If the CPU has a clock frequency higher than the reference clock frequency and the I/F has the transfer speed lower than the reference transfer speed, a JPEG file that is created by compressing the image at another high compression ratio (hereinafter, "first JPEG-compressed image") is created.

If the CPU has a clock frequency lower than the reference clock frequency and the I/F has the transfer speed higher than the reference transfer speed, the third small image is created. If the CPU has a clock frequency lower than the reference clock frequency and the I/F has the transfer speed lower than the reference transfer speed, the fourth small image is created.

The volumes of the first small image, the second small image, the third small image, and the fourth small image are arranged in this order with the first small image being smallest. The compression ratio at the first JPEG-compressed image is higher than the compression ration at the second JPEG-compressed image.

In this manner, creation of the small file makes it possible to display the image data in the manner suitable for the performances of the CPU and the performances of the I/F (high-speed display).

The uncompressed file larger than the reference size and the compressed file smaller than the reference size are used in the description of the first embodiment; however, it is allowable to use a first compressed file that is compressed at a compression ratio smaller than a reference ratio and a second compressed file that is compressed at a compression ratio larger than the reference ratio instead of the uncompressed file and the compressed file.

In the first embodiment, in response to the file acquirement request from the display control unit 42, the storing/processing unit 45 performs the static process of selecting the file by referring to the selection information that is pre-stored associated with the file. In a second embodiment of the present invention, in contrast, the storing/processing unit 45 performs a dynamic process of detecting a communication load at receiving the file acquirement request from the display control unit 42, and selecting the file suitable for the detected communication load.

The compressed file and the uncompressed file are stored in the storage unit 44 in the first embodiment: however, a large file and a small file are used instead of the compressed file and the uncompressed file in the second embodiment. Assume that the large file includes image data larger than a reference size, and the small file includes image data smaller than the reference size.

Figure 8:
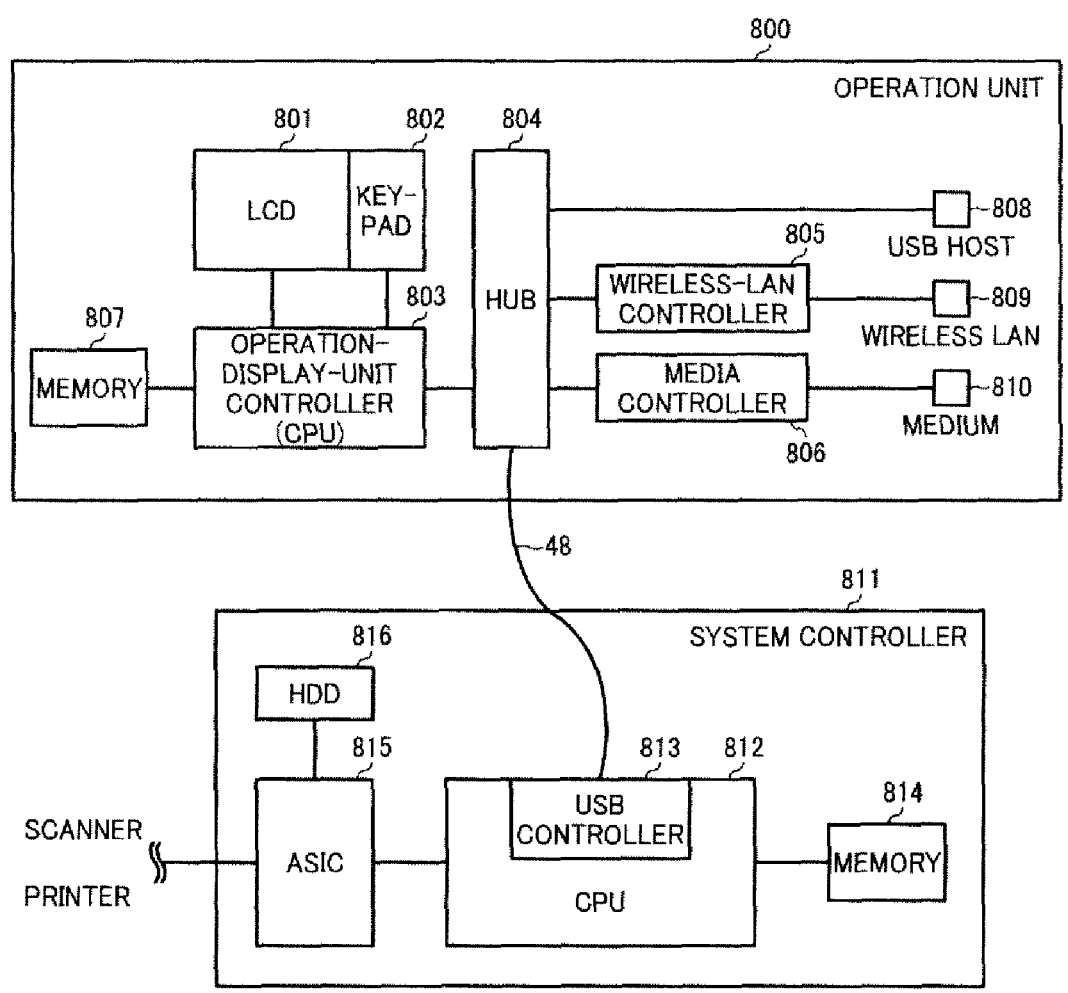
FIG. 8 is a block diagram of hardware configuration of an image processing apparatus according to the second embodiment.

FIG. 8 is a block diagram of hardware configuration of an image processing apparatus according to the second embodiment. The image processing apparatus includes an operation unit 800, a system controller 811, the I/F 48 that connects the operation unit 800 and the system controller 811 and transfers data between the operation unit 800 and the system controller 811.

The system controller 811 stores therein contents of the image to be displayed on the operation unit 800 (hereinafter, "image contents"), and sends the image contents to the operation unit 800. The system controller 811 performs handling of the image in the scanner or the printer, and I/O control to/from the network.

The system controller 811 includes a CPU 812, a USB controller 813, a memory 814, an ASIC 815, and an HDD 816.

The operation unit 800 includes an LCD 801, a keypad 802, an operation-display-unit controller 803, a memory 807, a hub controller 804, a USB host 808, a wireless-LAN controller 805, a wireless local area network (wireless LAN) 809, a media controller 806, a medium 810.

The user operates the image processing apparatus with the operation unit 800. The LCD 801 is a display unit. The keypad 802 includes keys with which the user inputs various operations. The operation-display-unit controller 803 performs display control on the LCD 801. The memory 807 is a temporary memory that stores therein the file to be displayed. The hub controller 804 communicates with the USB controller 813. The USB host 808 is a USB host connector. The wireless LAN 809 is a LAN via which data is wirelessly transferred. The wireless-LAN controller 805 is a controller for the wireless LAN 809. The medium 810 is, for example, a floppy disk or a compact disk-read only memory (CD-ROM). The media controller 806 is a controller for the medium 810.

The image contents are stored in the HDD 816. Upon receiving a request from the operation-display-unit controller 803, the CPU 812 reads the target file from the HDD 816, and sends the acquired file to the operation-display-unit controller 803. Upon receiving the file, the operation-display-unit controller 803 stores the received file in the memory 807. After that, the operation-display-unit controller 803 outputs the file to the LCD 801. As a result, the target image contents are displayed on the operation unit 800.

Figure 9:
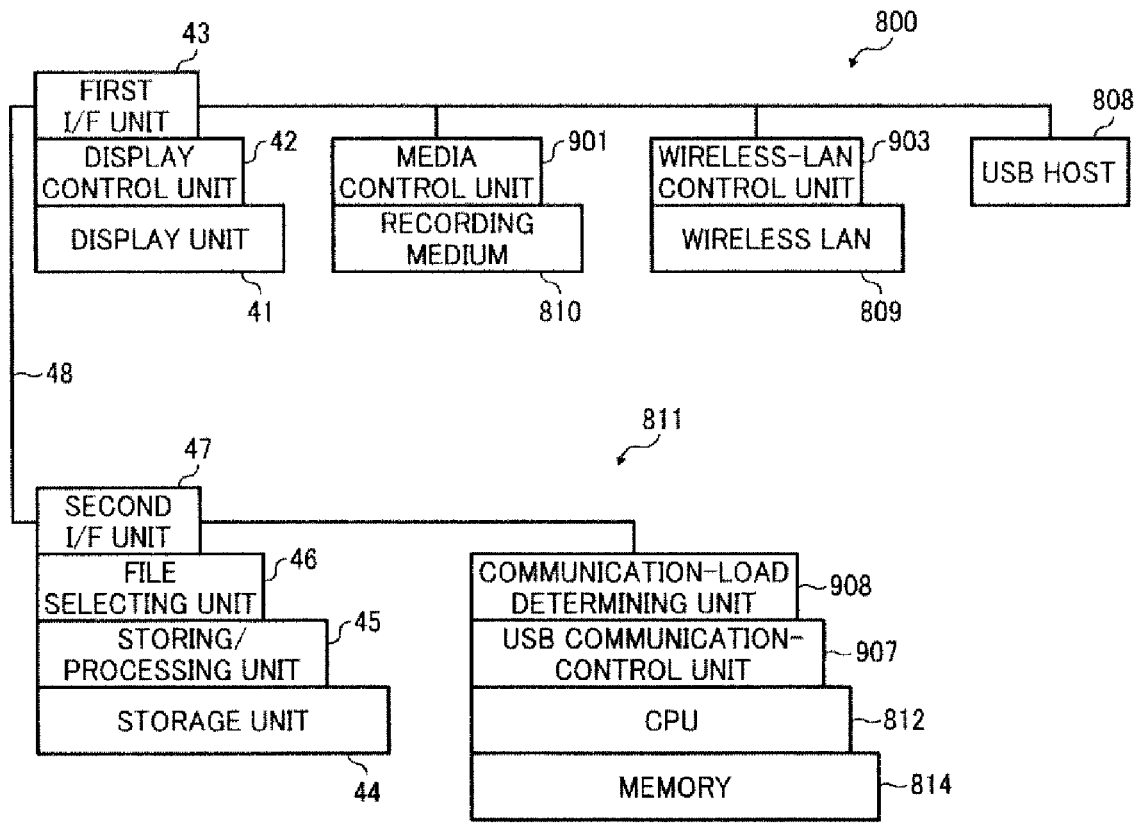
FIG. 9 is a block diagram of software configuration of the image processing apparatus shown in FIG. 8.

FIG. 9 is a block diagram of software configuration of the image processing apparatus according to the second embodiment. As shown in FIG. 9, the image processing apparatus includes the operation unit 800 and the system controller 811.

The operation unit 800 includes the first I/F unit 43, the display control unit 42, the display unit 41, a media control unit 901, the medium 810, a wireless-LAN control unit 903, the wireless LAN 809, and the USB host 808.

The system controller 811 includes the second I/F unit 47, the file selecting unit 46, the storing/processing unit 45, the storage unit 44, a communication-load determining unit 908, a USB communication-control unit 907, the CPU 812, and the memory 814.

Because the functions and the configurations of the first I/F unit 43, the display control unit 42, the display unit 41, the second I/F unit 47, the storing/processing unit 45, the storage unit 44, and the I/F 48 are the same as those in the first embodiment, the same description is not repeated.

The file selecting unit 46 according to the second embodiment selects either the small file or the large file according to information about the amount of the communication load received from the communication-load determining unit 908.

The media control unit 901, which is implemented as the media controller 806, communicates with the USB communication-control unit 907, and performs communication control for the medium 810 The wireless-LAN control unit 903, which is implemented as the wireless-LAN controller 805, communicates with the USB communication-control unit 907, and performs communication control for the wireless LAN 809. The USB host 808 communicates with the USB communication-control unit 907.

The USB communication-control unit 907 performs communication control for the USB as the USB host controller. The USB communication-control unit 907 is connected to various devices. The USB communication-control unit 907 creates structures called "queue head" on the memory 814 in a one-to-one manner corresponding to the connected devices.

Figure 10:
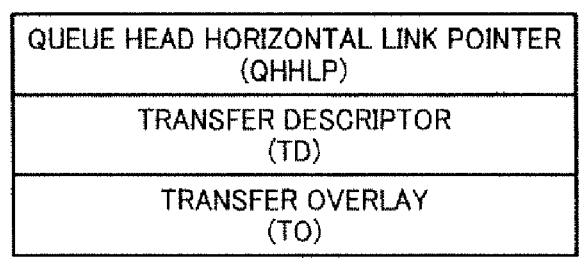
FIG. 10 is a schematic diagram of a QH structure.

FIG. 10 is a schematic diagram of the queue head (QH) structure. The QH structure includes a queue head horizontal link pointer (QHHLP), transfer overlay data (TO data), and transfer descriptor (TD).

The QHHLP is data indicative of an address of a next QH structure to be processed by the USB communication-control unit 907. The TO data is an address in which information indicative of presence of a transfer request, size of data to be transferred, and data to be transferred are stored. The TD is an address of the TO data.

Figure 11:
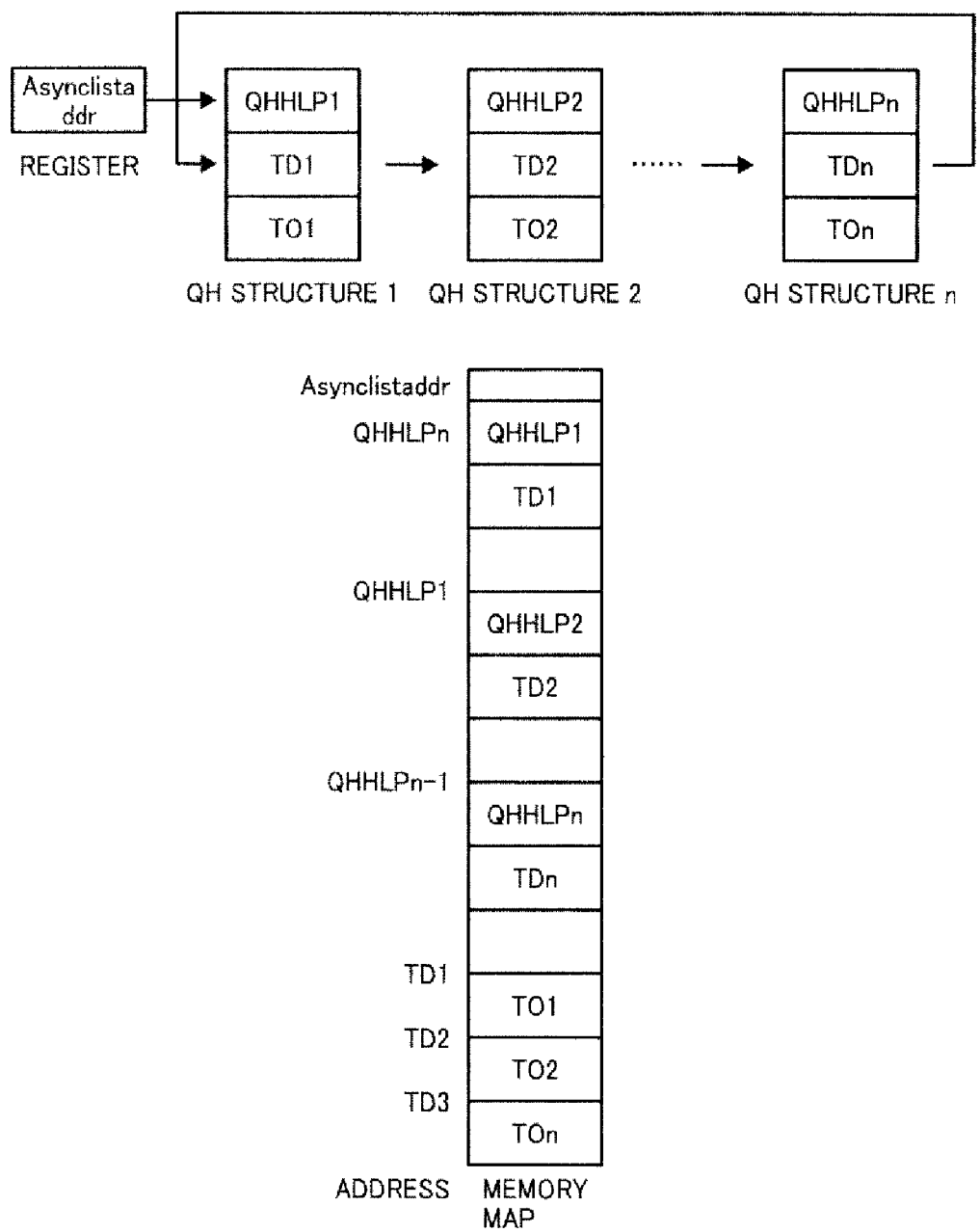
FIG. 11 is a schematic diagram for explaining locations of pieces of data in the QH structure and a process of handling the QH structures according to the second embodiment.

FIG. 11 is a schematic diagram for explaining locations of pieces of data in the QH structure and a process of handling the QH structures according to the second embodiment. The USB communication-control unit 907 polls the QH structures one after another to check the TD.

If an invalid bit (t-bit) of the QHHLP is ON, the USB communication-control unit 907 skips the QH structure, and goes to the next QH structure. If the QH structure includes no TD, the USB communication-control unit 907 determines that no process is needed for the QH structure, and goes to the next QH structure by referring to the address data indicative of the next QH structure. If the QH structure includes the TD, the USB communication-control unit 907 acquires the TO data by referring to the TD, and communicates with the corresponding endpoint based on the TO data. When the communications process has completed, the USB communication-control unit 907 goes to the next QH structure by referring to the address data indicative of the next QH structure.

The communication-load determining unit 908 determines the communication load by using the QH structures processed by the USB communication-control unit 907. More particularly, if the calculated communication speed is higher than a reference speed, the communication-load determining unit 908 determines that the communication load is large. If the calculated communication speed is lower than the reference speed, the communication-load determining unit 908 determines that the communication load is small. The communication speed depends on a size of data transferred within a predetermined unit time. In other words, the communication-load determining unit 908 compares a size of transferred data acquired from the TO data with a reference size to determine whether the communication speed is higher than the reference speed.

Figure 12:
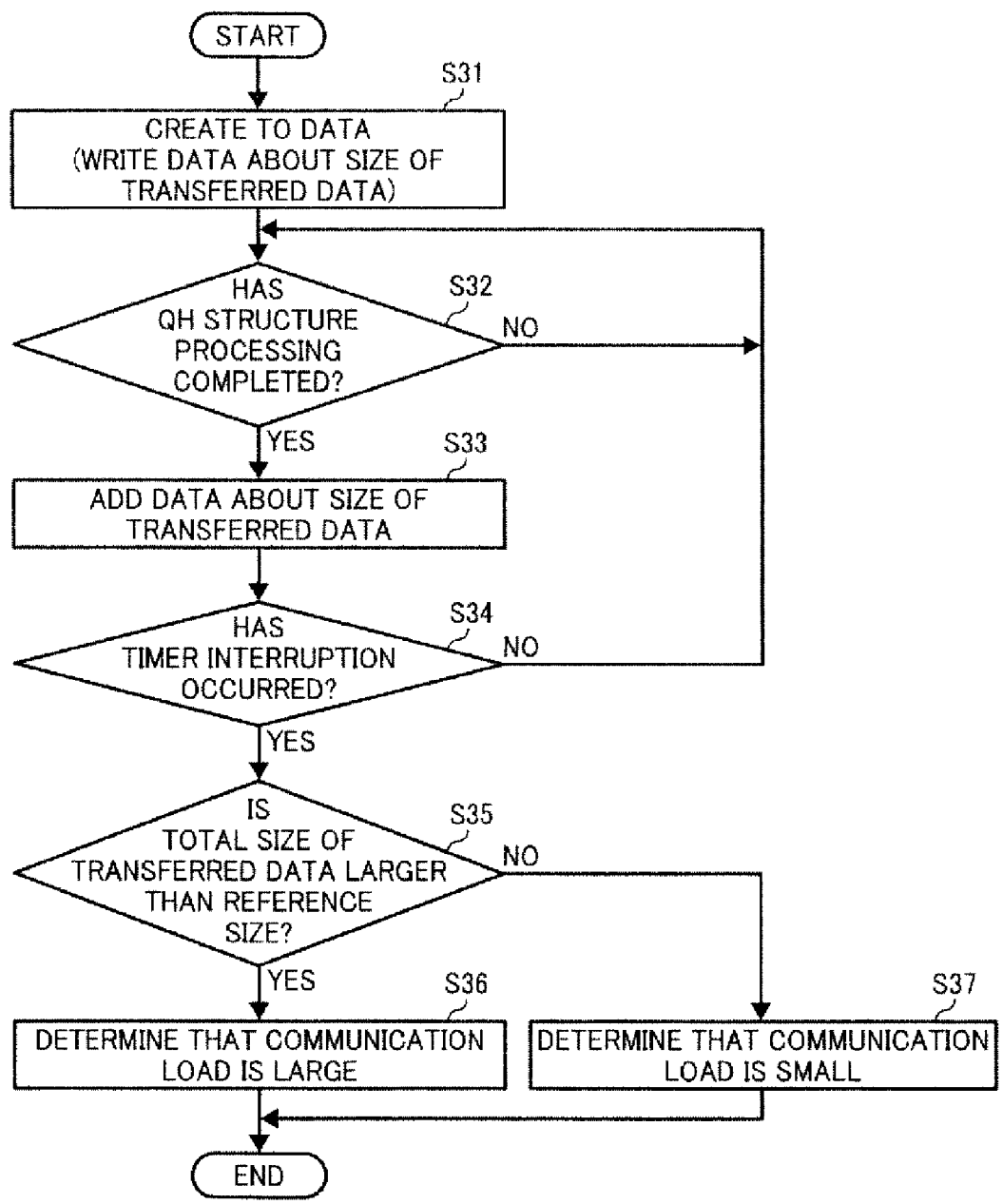
FIG. 12 is a communication-load determining process.

When the file selecting unit 46 receives the image-data acquisition request from the display control unit 42, the communication-load determining unit 908 receives a request for the communication-load determination. FIG. 12 is a process in which the communication-load determining unit 908 determines the communication load.

Upon receiving the request for the communication-load determination from the file selecting unit 46, the communication-load determining unit 908 creates the TO data, and stores the created TO data in an arbitrary address on the memory 814 (Step S31). If the QH-structure processing has not been completed (No at Step S32), the communication-load determining unit 908 waits until the QH-structure processing has been completed.

If the QH-structure processing has been completed (Yes at Step S32), the communication-load determining unit 908 adds the size of the transferred data to calculate the size of the data transferred within the unit time (Step S33). The communication-load determining unit 908 determines whether a timer interruption occurs (Step S34). The timer interruptions occur at equal intervals. If no timer interruption occurs (No at Step S34), the process control goes to Step S32, and the communication-load determining unit 908 waits for the timer interruption.

If the timer interruption occurs (Yes at Step S34), the communication-load determining unit 908 determines whether the total size of the transferred data is larger than the reference size (Step S35).

If the total size of the transferred data is larger than the reference size (Yes at Step S35), the communication-load determining unit 908 determines that the communication load is large (Step S36), and sends the result of the determination to the storing/processing unit 45. The file selecting unit 46 selects the small file.

If the total size of the transferred data is smaller than the reference size (No at Step S35), the communication-load determining unit 908 determines that the communication load is small (Step S37), and sends the result of the determination to the storing/processing unit 45. The file selecting unit 46 selects the large file.

With this configuration, the small file or the large file is selected according to the communication load, the selected file is transferred via the I/Fs, and the target image is displayed on the display unit. In this manner, the image data of either the large file or the small file is displayed in the shorter time.

Even if the communication load is determined to be large and therefore the small file is selected, the communication load can be still large. In such a case, through an arbitration process by using the arbiter, the communications between the USB controller 813 and various devices other than the LCD 801 such as the wireless-LAN controller 805, the media controller 806, and the USB host 808 are stopped. This increases the communication speed from the USB controller 813 to the operation-display-unit controller 803, and therefore further shortens the display time that it takes to display the image since the USB controller 813 sends the small file to the operation-display-unit controller 803.

Figure 13:
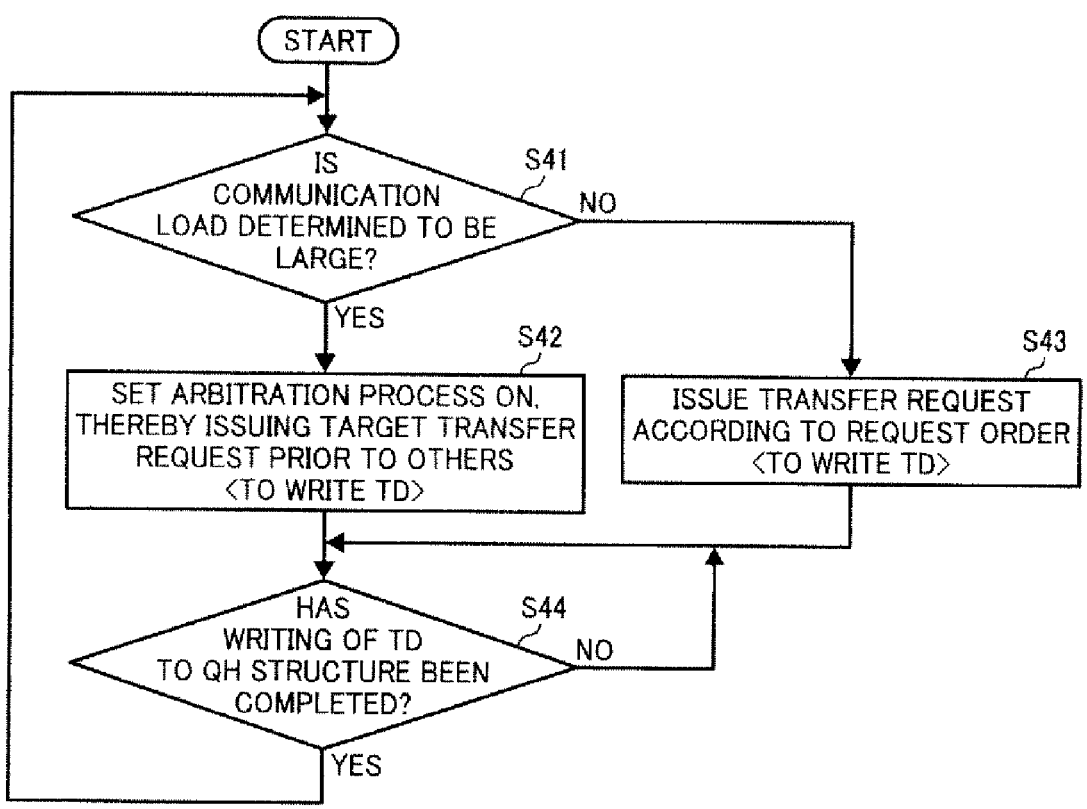
FIG. 13 is a flowchart of an arbitration process that is performed, after selecting a small file because of a large communication load, to send the small file.

FIG. 13 is a flowchart of the arbitration process that is performed, after selecting the small file because of the large communication load, to send the small file to the operation unit 800.

The communication-load determining unit 908 calculates the communication load to be generated when the small file is sent, and determines whether the calculated communication load is large (Step S41). If the calculated communication load is large (Yes at Step S41), the communication-load determining unit 908 sets the arbitration process ON, thereby issuing the target transfer request prior to the other transfer requests (Step S42). More particularly, the communication-load determining unit 908 issues the TD to the QH structure through the arbitration process to stop communications with the devices other than the operation-display-unit controller 803. As a result, the target transfer request is sent from the USB controller 813 to the operation-display-unit controller 803 prior to the other transfer requests.

If the calculated communication load is not large (No at Step S41), the communication-load determining unit 908 issues the transfer request according to the request order (Step S43). In other words, the communication-load determining unit 908 does not perform the arbitration process, i.e., does not issue the TD to the QH structure.

The communication-load determining unit 908 determines whether writing of the TD to the QH structure has been completed (Step S44). If the writing of the TD to the QH structure has been completed (Yes at Step S44), the process control goes to Step S41. If the writing of the TD to the QH structure has not been completed (No at Step S44), the communication-load determining unit 908 waits for the completion of the TD writing.

In this manner, in a case where the communication load is determined to be large, and therefore the small file is selected, however, the communication load to be generated when the small file is sent is still large; the communication-load determining unit 908 shortens the display time that it takes to display the small file on the display unit by performing the arbitration process.

In this manner, the image processing apparatus according to the second embodiment stores therein the large file and the small file. Only if the communication-load determining unit 908 determines that the communication load is large, the small file is selected and sent to the operation unit. This shortens the display time even under the large communication load. Moreover, because the allowable communication bandwidth is large as compared with the conventional system assuming the largest communication load, it is possible to reduce the manufacture costs for establishing the system. Furthermore, only when the communication load is still large, through the arbitration process performed by the USB communication-control unit 907, the priority for data transfer to the extension devices other than the image display is lowered temporarily. With this configuration, the display time is shortened even under the large communication load by the operation of the USB communication-control unit 907, and thus the speed for browsing the image data is improved.

As described above, according to one aspect of the present invention, a speed for browsing image data increases by storing therein both large image data having a file size larger than a reference size and small image data having a file size smaller than the reference size, and selecting the image data having a shorter display time between the large image data or the small image data. Contents of the large image data and the small image data are the same as contents of original image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a storage unit that stores therein first image data having a file size smaller than a predetermined size and a second image data having a file size larger than the predetermined size, the first image data and the second image data representing same contents;
   a file selecting unit that selects either one of the first image data and the second image data whichever having a shorter display time
   a display unit that displays thereon selected image data; and
   a storage processing unit that creates the first image data and the second image data from image data to be displayed, stores the first image data and the second image data in the storage unit, calculates a first display time for displaying the first image data and a second display time for displaying the second image data, creates selection information indicating image data having a shorter display time between the first display time and the second display time, and stores the selection information in the storage unit.

2. The image processing apparatus according to claim 1, wherein the file selecting unit selects either one of the first image data and the second image data based on the selection information stored in the storage unit.

3. The image processing apparatus according to claim 1, further comprising:
a communication control unit that performs a communication control in the image processing apparatus; and
a communication-load determining unit that measures a communication speed, determines that a communication load is large when the communication speed is higher than a predetermined speed, and determines that the communication load is small when the communication speed is lower than the predetermined speed, wherein
when the communication-load determining unit determines that the communication load is large, the file selecting unit selects the first image data, and
when the communication-load determining unit determines that the communication load is small, the file selecting unit selects the second image data.

4. The image processing apparatus according to claim 3, wherein
the communication control unit controls a communication between a system controller of the image processing apparatus and a target devices, and
when the communication-load determining unit determines that the communication load is large, the communication control unit temporarily stops the communication between the system controller and the target device other than the display unit to shorten the display time for displaying the selected image data on the display unit.

5. The image processing apparatus according to claim 1, wherein when performances of a central processing unit and an interface are changed in the image processing apparatus, the storage processing unit creates the first image data from the second image data.

6. The image processing apparatus according to claim 1, wherein the storage processing unit creates the first image data as compressed image data and the second image data as uncompressed image data.

7. An image processing method for an image processing apparatus that includes a storage unit that stores therein first image data having a file size smaller than a predetermined size and a second image data having a file size larger than the predetermined size in a storage unit the first image data and the second image data representing same contents and a display unit that displays thereon image data, the image processing method comprising:
selecting either one of the first image data and the second image data whichever having a shorter display time;
displaying selected image data on the display unit;
creating the first image data and the second image data from image data to be displayed;
storing the first image data and the second image data in the storage unit;
calculating a first display time for displaying the first image data and a second display time for displaying the second image data;
creating selection information indicating image data having a shorter display time between the first display time and the second display time; and
storing the selection information in the storage unit.

8. The image processing method according to claim 7, wherein the selecting includes selecting either one of the first image data and the second image data based on the selection information stored in the storage unit.

9. The image processing method according to claim 7, wherein
the image processing apparatus further includes a communication control unit that performs a communication control in the image processing apparatus,
the image processing method further comprises communication-load determining including
measuring a communication speed,
determining that a communication load is large when the communication speed is higher than a predetermined speed, and
determining that the communication load is small when the communication speed is lower than the predetermined speed,
when it is determined that the communication load is large, the selecting includes selecting the first image data, and
when it is determined that the communication load is small, the selecting includes selecting the second image data.

10. The image processing method according to claim 9, further comprising:
controlling including the communication control unit controlling a communication between a system controller of the image processing apparatus and a target devices, and
when it is determined that the communication load is large, the controlling includes temporarily stopping the communication between the system controller and the target device other than the display unit to shorten the display time for displaying the selected image data on the display unit.

11. The image processing method according to claim 7, wherein when performances of a central processing unit and an interface are changed in the image processing apparatus, the creating includes creating the first image data from the second image data.

12. The image processing method according to claim 7, wherein the creating includes creating the first image data as compressed image data and the second image data as uncompressed image data.

13. A computer program product comprising a non-transitory computer-readable medium having computer-readable program codes embodied in the medium for processing image in an image processing apparatus that includes a storage unit that stores therein first image data having a file size smaller than a predetermined size and a second image data having a file size larger than the predetermined size in a storage unit, the first image data and the second image data representing same contents and a display unit that displays thereon image data, the program codes that when executed causing a computer to execute:
selecting either one of the first image data and the second image data whichever having a shorter display time;
displaying selected image data on the display unit;
creating the first image data and the second image data from image data to be displayed;
storing the first image data and the second image data in the storage unit;
calculating a first display time for displaying the first image data and a second display time for displaying the second image data;
creating selection information indicating image data having a shorter display time between the first display time and the second display time; and
storing the selection information in the storage unit.

* * * * *